US00RE44462E

(19) United States
(12) Reissued Patent
Prim

(10) Patent Number: US RE44,462 E
(45) Date of Reissued Patent: Aug. 27, 2013

(54) CARBON DIOXIDE FRACTIONALIZATION PROCESS

(71) Applicant: Pilot Energy Solutions, LLC, Houston, TX (US)

(72) Inventor: Eric Prim, Springs, TX (US)

(73) Assignee: Pilot Energy Solutions, LLC, Houston, TX (US)

(21) Appl. No.: 13/735,646

(22) Filed: Jan. 7, 2013

Related U.S. Patent Documents

Reissue of:
(64) Patent No.: 7,777,088
Issued: Aug. 17, 2010
Appl. No.: 11/621,913
Filed: Jan. 10, 2007

(51) Int. Cl.
*C07C 7/144* (2006.01)

(52) U.S. Cl.
USPC ..... 585/818; 585/802; 585/833; 585/837

(58) Field of Classification Search
None
See application file for complete search history.

(56) References Cited

U.S. PATENT DOCUMENTS

| | | | |
|---|---|---|---|
| 4,130,403 | A | 12/1978 | Cooley et al. |
| 4,322,225 | A | 3/1982 | Bellinger et al. |
| 4,428,829 | A | 1/1984 | Kosters |
| 4,459,142 | A | 7/1984 | Goddin, Jr. |
| 4,563,202 | A | 1/1986 | Yao et al. |
| 4,854,955 | A | 8/1989 | Campbell et al. |
| 4,869,740 | A | 9/1989 | Campbell et al. |
| 4,889,545 | A | 12/1989 | Campbell et al. |
| H825 | H | 10/1990 | Green |
| 5,064,525 | A | 11/1991 | Frame et al. |
| 5,114,451 | A | 5/1992 | Rambo et al. |
| 5,275,005 | A | 1/1994 | Campbell et al. |
| 5,555,748 | A | 9/1996 | Campbell et al. |
| 5,568,737 | A | 10/1996 | Campbell et al. |
| 5,771,712 | A | 6/1998 | Campbell et al. |
| 5,779,507 | A | 7/1998 | Yeh |
| 5,799,507 | A | 9/1998 | Wilkinson et al. |
| 5,881,569 | A | 3/1999 | Campbell et al. |
| 5,890,378 | A | 4/1999 | Rambo et al. |
| 5,983,664 | A | 11/1999 | Campbell et al. |
| 6,182,469 | B1 | 2/2001 | Campbell et al. |
| 6,244,070 | B1 | 6/2001 | Lee et al. |
| 6,526,777 | B1 | 3/2003 | Campbell et al. |

(Continued)

OTHER PUBLICATIONS

Process Flow Diagrams D-2021-7000-06 through D-2021-7000-08 dated Jul. 13, 1981, 3 Pages.

(Continued)

*Primary Examiner* — Tam M Nguyen
(74) *Attorney, Agent, or Firm* — Tomlinson Rust McKinstry Grable

(57) ABSTRACT

A process comprising receiving a hydrocarbon feed stream comprising carbon dioxide, separating the hydrocarbon feed stream into a light hydrocarbon stream and a heavy hydrocarbon stream, separating the light hydrocarbon stream into a carbon dioxide-rich stream and a carbon dioxide-lean stream, and feeding the carbon dioxide-lean stream into a hydrocarbon sweetening process, thereby increasing the processing capacity of the hydrocarbon sweetening process compared to the processing capacity of the hydrocarbon sweetening process when fed the hydrocarbon feed stream. Included is an apparatus comprising a first separation unit that receives a hydrocarbon feed stream containing carbon dioxide and produces a heavy hydrocarbon stream and a light hydrocarbon stream, and a second separation unit that receives the light hydrocarbon stream and produces a carbon dioxide-rich stream and a carbon dioxide-lean stream, wherein the apparatus is configured to feed the carbon dioxide-lean stream to a physical solvent, membrane, or carbon dioxide recovery process.

8 Claims, 2 Drawing Sheets

(56) References Cited

U.S. PATENT DOCUMENTS

| | | | | |
|---|---|---|---|---|
| 6,742,358 | B2 | 6/2004 | Wilkinson et al. | |
| 6,755,965 | B2 | 6/2004 | Pironti et al. | |
| 6,889,523 | B2 | 5/2005 | Wilkinson et al. | |
| 6,915,662 | B2 | 7/2005 | Wilkinson et al. | |
| 6,945,075 | B2 | 9/2005 | Wilkinson et al. | |
| 7,010,937 | B2 | 3/2006 | Wilkinson et al. | |
| 7,152,430 | B1 * | 12/2006 | Parro | 62/624 |
| 7,155,931 | B2 | 1/2007 | Wilkinson et al. | |
| 7,191,617 | B2 | 3/2007 | Cueller et al. | |
| 7,204,100 | B2 | 4/2007 | Wilkinson et al. | |
| 7,210,311 | B2 | 5/2007 | Wilkinson et al. | |
| 7,216,507 | B2 | 5/2007 | Cuellar et al. | |
| 7,565,815 | B2 | 7/2009 | Wilkinson et al. | |
| 7,631,516 | B2 | 12/2009 | Cuellar et al. | |
| 2002/0065446 | A1 | 5/2002 | Wilkinson et al. | |
| 2002/0166336 | A1 | 11/2002 | Wilkinson et al. | |
| 2003/0005722 | A1 | 1/2003 | Wilkinson et al. | |
| 2004/0079107 | A1 | 4/2004 | Wilkinson et al. | |
| 2004/0177646 | A1 | 9/2004 | Wilkinson et al. | |
| 2004/0187520 | A1 | 9/2004 | Wilkinson et al. | |
| 2005/0066686 | A1 | 3/2005 | Wilkinson et al. | |
| 2005/0066815 | A1 | 3/2005 | Krushnevych et al. | |
| 2005/0204774 | A1 | 9/2005 | Foglietta et al. | |
| 2005/0247078 | A1 | 11/2005 | Wilkinson et al. | |
| 2005/0268649 | A1 | 12/2005 | Wilkinson et al. | |
| 2006/0000234 | A1 | 1/2006 | Cuellar et al. | |
| 2006/0032269 | A1 | 2/2006 | Cueallar et al. | |
| 2006/0042463 | A1 | 3/2006 | Frantz | |
| 2006/0283207 | A1 | 12/2006 | Pitman et al. | |
| 2007/0231244 | A1 | 10/2007 | Shah et al. | |
| 2008/0000265 | A1 | 1/2008 | Cuellar et al. | |
| 2008/0028790 | A1 | 2/2008 | Wilkinson et al. | |
| 2008/0078205 | A1 | 4/2008 | Cuellar et al. | |
| 2008/0190136 | A1 | 8/2008 | Pitman et al. | |
| 2008/0282731 | A1 | 11/2008 | Cuellar et al. | |

OTHER PUBLICATIONS

Process Flow Diagram, Ortloff CO-Frac Process, 1997, 1 page.
Process Flow Diagram, ARCO Permian-Willard Plant dated May 5, 1997, 1 page.
Recycle Split Vapor Process, Ortloff Engineers, Ltd., Jul. 13, 2005, 2 pages.
Lynch, et.al., Process Retrofits maximize the value of existing NGL and LPG recovery plants, 82nd Annual Convention of the Gas Processors Association, Mar. 10, 2003, 11 pages.
Lynch, et.al., Retrofit of the Amerada Hess Sea Robin Plant for Very High Ethane Recovery, 84th Annual Convention of the Gas Processors Association, Mar. 13, 2006, 15 pages.
Lynch, et.al., Next Generation Processes for NGL/LPG Recovery, 77th Annual Convention of the Gas Processors Association, Mar. 16, 1998, 13 pages.
Stewart, et.al., Increasing treating capacity, Hydrocarbon Engineering, Dec. 2000, 6 pages.
Ortloff Engineers, Ltd, "Sulfur Recovery Info", Aug. 18, 2010, 4 pages.
Gazzi, et. al., "New Process makes production of highly acid gas economical", World Oil, Aug. 1, 1982, pp. 73-78, Houston, TX, USA.
Manning, William P., "Gas Sweetening", Oilfield Processing of Petroleum-vol. One: Natural Gas, pp. 99-138, 1991.
Manning, Francis S., et al. "Natural Gas Liquids Recovery", Oilfield Processing of Petroleum-vol. One: Natural Gas, pp. 313-343, 1991.
Breckenridge, William, et al., "Use of SELEXOL Process in Coke Gasification to Ammonia Project", Laurance Reid Gas Conditioning Conference-University of Oklahoma, 20 pgs., Feb. 27-Mar. 1, 2000.
UPO LLC, "SELEXOL Process", 2 pgs., 2002.
PCT International Search Report; PCT Application No. PCT/US2008/050364; Apr. 30, 2008; 3 pgs.
PCT Written Opinion of the International Searching Authority; PCT Application No. PCT/US2008/050364; Apr. 30, 2008; 3 pgs.

* cited by examiner

CARBON DIOXIDE FRACTIONALIZATION PROCESS

Matter enclosed in heavy brackets [ ] appears in the original patent but forms no part of this reissue specification; matter printed in italics indicates the additions made by reissue.

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Carbon dioxide is a naturally occurring substance in most hydrocarbon formations. While the carbon dioxide concentration will depend on the location of the formation, carbon dioxide concentrations as high as eighty percent are common in many areas, such as West Texas. Moreover, the implementation of tertiary recovery operations, such as carbon-dioxide injection into the subterranean wellbore, can increase the carbon dioxide concentration within the produced hydrocarbons. In either case, the carbon dioxide concentration of the produced hydrocarbons may be sufficiently high to require the carbon dioxide concentration to be reduced before the hydrocarbons can be refined or further processed.

Several solutions are known for reducing the carbon dioxide concentration or "sweetening" a hydrocarbon stream. For example, amine processes, physical solvent processes, membrane processes, and carbon dioxide recovery processes have all been used to sweeten hydrocarbon streams. The processing facilities employing these hydrocarbon sweetening processes are generally sized for a specific processing capacity and hydrocarbon feed stream composition. As such, when the carbon dioxide concentration of the hydrocarbon feed stream increases or additional feedstock comes online, then an additional processing facility must be constructed to compensate for the change in hydrocarbon feed stream composition or the increased feedstock. The construction of a new processing facility is undesirable because of the substantial capital cost, operating costs, and time delay inherent in such a solution.

SUMMARY

In one aspect, the disclosure includes a process comprising receiving a hydrocarbon feed stream comprising carbon dioxide, separating the hydrocarbon feed stream into a light hydrocarbon stream and a heavy hydrocarbon stream, separating the light hydrocarbon stream into a carbon dioxide-rich stream and a carbon dioxide-lean stream, and feeding the carbon dioxide-lean stream into a hydrocarbon sweetening process, thereby increasing the processing capacity of the hydrocarbon sweetening process compared to the processing capacity of the hydrocarbon sweetening process when fed the hydrocarbon feed stream.

In another aspect, the disclosure includes an apparatus comprising a first separation unit that receives a hydrocarbon feed stream containing carbon dioxide and produces a heavy hydrocarbon stream and a light hydrocarbon stream, and a second separation unit that receives the light hydrocarbon stream and produces a carbon dioxide-rich stream and a carbon dioxide-lean stream, wherein the apparatus is configured to feed the carbon dioxide-lean stream to a physical solvent process, a membrane process, a chemical solvent process, an extractive distillation process or a carbon dioxide recovery process.

In a third aspect, the disclosure includes a process comprising receiving a hydrocarbon feed stream comprising carbon dioxide, cooling the hydrocarbon feed stream using a carbon dioxide-lean stream, separating the cooled hydrocarbon feed stream into a light hydrocarbon stream and a heavy hydrocarbon stream, compressing the light hydrocarbon stream, cooling the compressed light hydrocarbon stream using the carbon dioxide-lean stream, separating the compressed light hydrocarbon stream into a carbon dioxide-rich stream and the carbon dioxide-lean stream, and removing at least some of the carbon dioxide in the carbon dioxide-lean stream using a hydrocarbon sweetening process.

DETAILED DESCRIPTION OF THE PREFERRED EMBODIMENTS

Disclosed herein is a carbon dioxide fractionalization process that may be positioned in front of an existing hydrocarbon sweetening process to increase the processing capacity of the hydrocarbon sweetening process. Specifically, the carbon dioxide fractionalization process purifies the hydrocarbon feed stream by removing at least some of the carbon dioxide and the heavy hydrocarbons from a hydrocarbon feed stream. The purification of the hydrocarbon stream reduces the carbon dioxide and heavy hydrocarbon loading on the hydrocarbon sweetening process, thereby increasing the processing capacity of the hydrocarbon sweetening process. Furthermore, the carbon dioxide fractionalization process produces a carbon dioxide-rich stream that may be injected into a subterranean formation.

Figure 1:
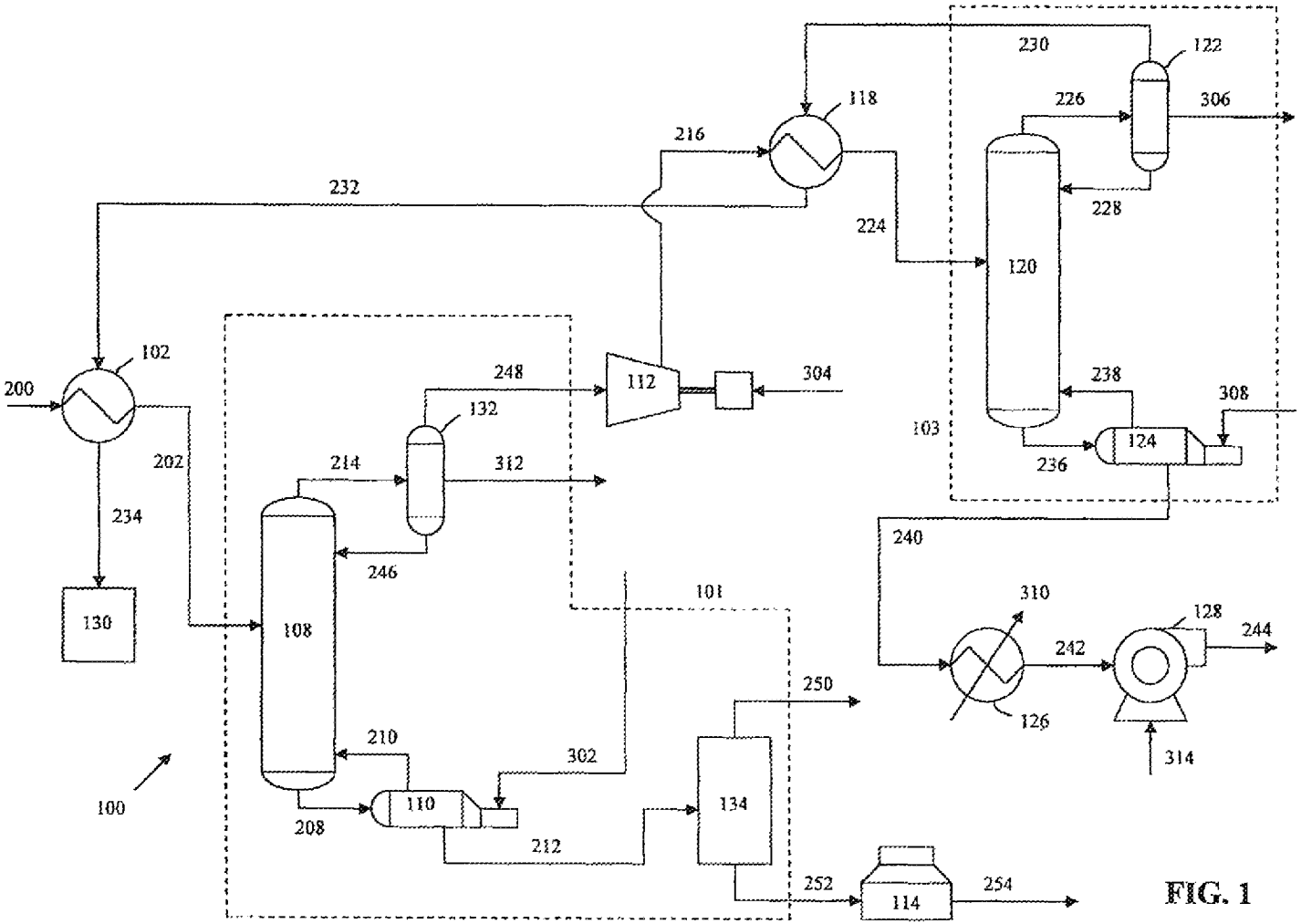
FIG. 1 is a process flow diagram of one embodiment of the carbon dioxide fractionalization process.

FIG. 1 illustrates one embodiment of the carbon dioxide fractionalization process 100. The carbon dioxide fractionalization process 100 separates a hydrocarbon feed stream 200 into a heavy hydrocarbon stream 254, an acid gas stream 250, a carbon dioxide-rich stream 244, and a carbon dioxide-lean stream 234, the compositions of which are discussed in detail below. The carbon dioxide fractionalization process 100 receives the hydrocarbon feed stream 200 and may pass the hydrocarbon feed stream 200 through a heat exchanger 102 that uses the cooled carbon dioxide-lean stream 232 to reduce the temperature of the hydrocarbon feed stream 200. A first separation unit 101 that comprises one or more of a separator 108, a reboiler 110, a condenser 132, and a separator 134 may then remove the heavy hydrocarbons from the cooled hydrocarbon feed stream 202. Specifically, the separator 108 separates the cooled hydrocarbon feed stream 202 into a bottom effluent stream 208 and a top effluent stream 214. The top effluent stream 214 may then be fed into a condenser 132, which may give off energy 312 by being cooled, and separates the top effluent stream 214 into a reflux stream 246 and a light hydrocarbon stream 248. Similarly, the bottom effluent stream 208 may be fed into the reboiler 110, which may receive energy 302 by being heated, and separates the bottom effluent stream 208 into a recycle stream 210 and a heavy hydrocarbon stream 212. The heavy hydrocarbon stream 212 may then be fed into a separator 134 that separates an acid gas stream 250 from the heavy hydrocarbon stream 252. The heavy hydrocarbon stream 252 may optionally be cooled by a heat exchanger 114, for example an air cooler, to produce the heavy hydrocarbon stream 254.

Returning to the light hydrocarbon stream 248, the light hydrocarbon stream 248 may be fed into a compressor 112 that receives mechanical or electrical energy 304 and increases the pressure and/or temperature of the light hydrocarbon stream 248, thereby creating a compressed light hydrocarbon stream 216. The compressed light hydrocarbon stream 216 may then be fed into a heat exchanger 118 that uses a chilled carbon dioxide-lean stream 230 to reduce the temperature of the cooled light hydrocarbon stream 216, thereby producing a chilled light hydrocarbon stream 224. A second separation unit 103 that comprises one or more of a separator 120, a reboiler 124, and a condenser 122 may then remove at least some of the carbon dioxide from the chilled light hydrocarbon stream 224. Specifically, the separator 120 separates the chilled light hydrocarbon stream 224 into a heavy effluent stream 236 and a light effluent stream 226. The light effluent stream 226 may be fed into the condenser 122, which may give off energy 306 by being cooled, and separates the light effluent stream 226 into a reflux stream 228 and the chilled carbon dioxide-lean stream 230. The chilled carbon dioxide-lean stream 230 may then be passed through the heat exchangers 118, 102 and into a hydrocarbon sweetening process 130. The hydrocarbon sweetening process 130 may be any process that removes carbon dioxide from a hydrocarbon stream to make the hydrocarbon stream suitable for transportation and/or further processing. Persons of ordinary skill in the art are aware of numerous different hydrocarbon sweetening processes 130, as illustrated by Field Processing of Petroleum, Vol 1: Natural Gas by Manning et al., incorporated herein by reference as if reproduced in its entirety. Several examples of the hydrocarbon sweetening process 130 are discussed in detail below.

Returning to the separator 120, the heavy effluent stream 236 may be fed into the reboiler 124, which may receive energy 308 in the form of heat, and separates the heavy effluent stream 236 into a recycle stream 238 and a cooled carbon dioxide-rich stream 240. The cooled carbon dioxide-rich stream 240 may optionally be combined with the acid gas stream 250, if desired. The cooled carbon dioxide-rich stream 240 may then be fed through a heat exchanger 126 that further cools the cooled carbon dioxide-rich stream 240 by removing energy 310 from the cooled carbon dioxide-rich stream 240, thereby producing the chilled carbon dioxide-rich stream 242. The chilled carbon dioxide-rich stream 242 may also be fed to a pump 128 that uses energy 314 to pump the carbon dioxide-rich stream 244 to another location, perhaps for injection into a subterranean formation.

Figure 2:
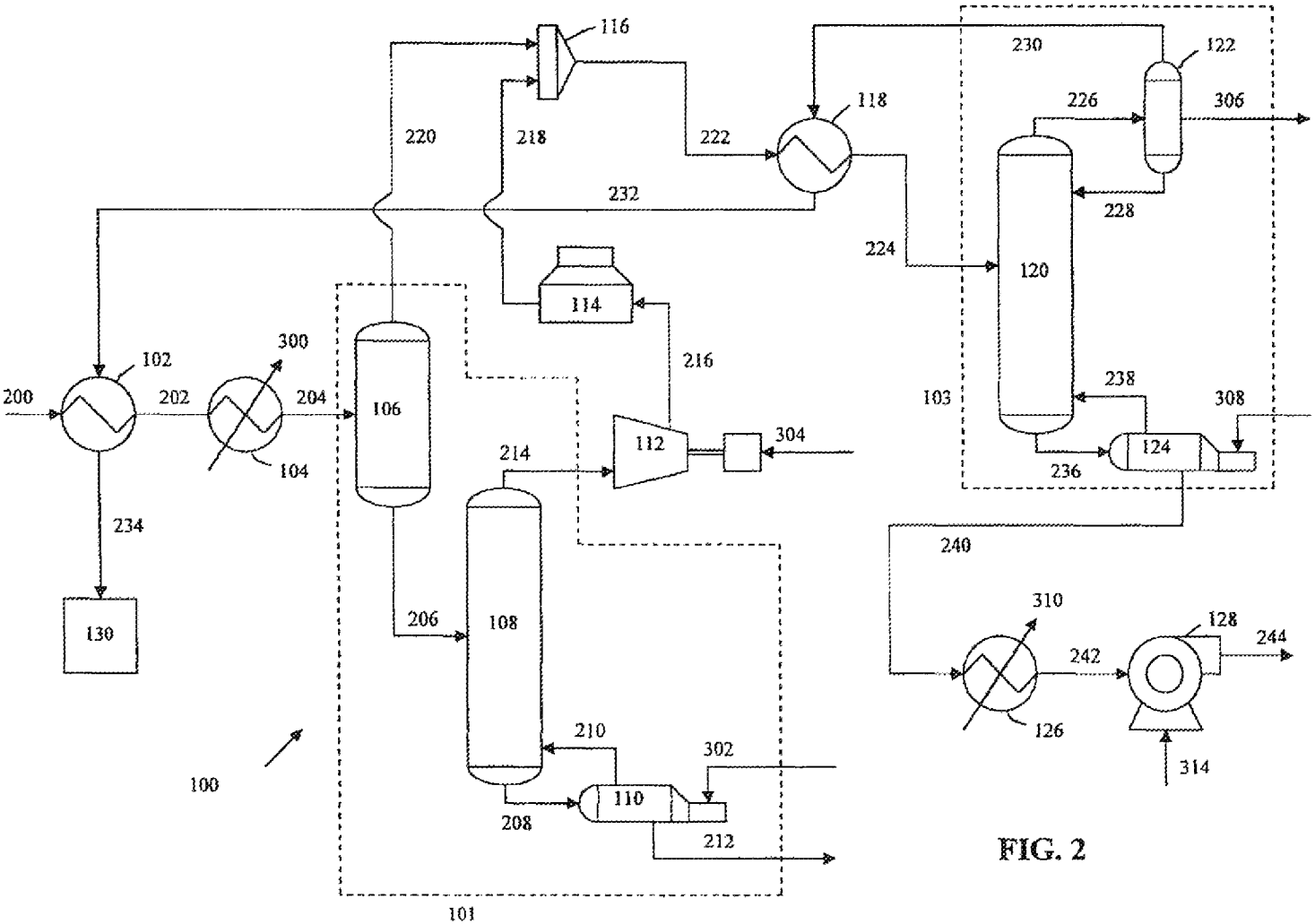
FIG. 2 is a process flow diagram of another embodiment of the carbon dioxide fractionalization process.

FIG. 2 illustrates another embodiment of the carbon dioxide fractionalization process 100. Similar to the embodiment shown in FIG. 1, the carbon dioxide fractionalization process 100 shown in FIG. 2 separates the hydrocarbon feed stream 200 into the heavy hydrocarbon stream 212, the carbon dioxide-rich stream 244, and the carbon dioxide-lean stream 234, the compositions of which are discussed in detail below. The carbon dioxide fractionalization process 100 receives the hydrocarbon feed stream 200 and passes the hydrocarbon feed stream 200 through a heat exchanger 102 that uses the cooled carbon dioxide-lean stream 232 to reduce the temperature of the hydrocarbon feed stream 200. After the cooled hydrocarbon feed stream 202 exits the heat exchanger 102, the hydrocarbon feed stream is fed into the optional heat exchanger 104, which further cools the cooled hydrocarbon feed stream 202 by removing some of its energy 300, thereby producing a chilled hydrocarbon feed stream 202.

A first separation unit 101 that comprises one or more of separators 106, 108 and the reboiler 110 may then remove the heavy hydrocarbons from the cooled chilled hydrocarbon feed stream 202. Specifically, the chilled hydrocarbon feed stream 202 may be fed into a separator 106 that separates the chilled hydrocarbon feed stream 202 into a light fraction 220 and a heavy fraction 206. In an embodiment, the light fraction 220 may be a vapor phase and the heavy fraction 206 may be a liquid phase. The light fraction 220 may be combined with the cooled light hydrocarbon stream 216 in a mixer 116 and the heavy fraction 206 may be fed into the separator 108. The separator 108 separates the heavy fraction 206 into a bottom effluent stream 208 and a top effluent stream 214. The bottom effluent stream 208 may be fed into a reboiler 110, which may receive energy 302 by being heated, and separates the bottom effluent stream 208 into a recycle stream 210 and the heavy hydrocarbon stream 212. The top effluent stream 214 may be fed into the compressor 112 that receives mechanical or electrical energy 304 and increases the pressure and/or temperature of the top effluent stream 214, thereby creating a compressed light hydrocarbon stream 216. The compressed light hydrocarbon stream 216 may optionally be cooled, for example, by the heat exchanger 114, which may be an air cooler, to produce a cooled light hydrocarbon stream 218. The cooled light hydrocarbon stream 218 may then be mixed with the light fraction 220 in the mixer 116. The resulting mixed light hydrocarbon stream 222 may then be processed as described above for the cooled light hydrocarbon stream 216 in FIG. 1 to produce the carbon dioxide-lean stream 234.

The hydrocarbon feed stream 200 may contain a mixture of hydrocarbons and carbon dioxide. Numerous types of hydrocarbons may be present in the hydrocarbon feed stream 200, including methane, ethane, propane, i-butane, n-butane, i-pentane, n-pentane, hexane, octane, and other hydrocarbon compounds. For example, the hydrocarbon feed stream 200 may contain from about 10 percent to about 60 percent methane, no more than about 10 percent ethane, and no more than about 5 percent propane and heavier hydrocarbons ($C_{3+}$). Although the hydrocarbon feed stream 200 may contain any carbon dioxide concentration, in various embodiments the hydrocarbon feed stream 200 contains from about 10 percent to about 90 percent, front about 30 percent to about 80 percent, or from about 50 percent to about 70 percent of the carbon dioxide. The hydrocarbon feed stream 200 may also include other compounds such as water, nitrogen, hydrogen sulfide ($H_2S$), and/or other acid gases. Finally, the hydrocarbon feed stream 200 may be in any state including a liquid state, a vapor state, or a combination of liquid and vapor states. Finally, unless otherwise stated, the percentages herein are provided on a mole basis.

Similar to the hydrocarbon feed stream 200, the carbon dioxide-lean stream 234 may contain a mixture of hydrocarbons and carbon dioxide. Specifically, the composition of the carbon dioxide-lean stream 234 may contain an increased methane concentration and a decreased carbon dioxide concentration compared to the hydrocarbon feed stream 200. In embodiments, the carbon dioxide-lean stream 234 contains less than about 60 percent, from about 20 percent to about 50 percent, or from about 30 percent to about 40 percent of the carbon dioxide. In yet other embodiments, the carbon dioxide concentration in the carbon dioxide-lean stream 234 is at least about 20 percent, at least about 40 percent, or at least about 60 percent less than the carbon dioxide concentration present in the hydrocarbon feed stream 200. The carbon dioxide-lean stream 234 may also contain a reduced concentration of $C_{3-}$ compared to the hydrocarbon feed stream 200. In various embodiments, the carbon dioxide-lean stream 234 comprises less than about 5 percent, less than about 1 percent, or is substantially free of $C_{3+}$. In yet other embodiments, the $C_{3+}$ concentration in the carbon dioxide-lean stream 234 is at least about 20 percent, at least about 40 percent, or at least about 60 percent less than the $C_{3+}$ concentration present in the hydrocarbon feed stream 200. Finally, in other embodiments, the carbon dioxide-lean stream 234 contains at least about 90 percent, at least about 98 percent, or at least about 99 percent of a combination of methane and carbon dioxide.

The heavy hydrocarbon streams 212, 254 may contain a mixture of heavy hydrocarbons and some other compounds. Specifically, the composition of the heavy hydrocarbon streams 212, 254 contains an increased $C_{3+}$ concentration and a decreased methane concentration, ethane, and carbon dioxide compared to the hydrocarbon feed stream 200. In embodiments, the heavy hydrocarbon streams 212, 254 comprises at least about 90 percent, at least about 95 percent, or at least about 99 percent $C_{3+}$. In other embodiments, the heavy hydrocarbon streams 212, 254 comprises less than about 5 percent, less than about 1 percent, or is substantially free of methane and/or ethane. In yet other embodiments, the heavy hydrocarbon streams 212, 254 contains less than about 10 percent, less than about 5 percent, or less than about 1 percent of the carbon dioxide. Alternatively, the heavy hydrocarbon streams 212, 254 comprises at least about 20 percent, at least about 40 percent, or at least about 60 percent less carbon dioxide than the hydrocarbon feed stream 200. In an embodiment, the heavy hydrocarbon streams 212, 254 described herein are suitable for use or sale as natural gas liquids (NGL).

The carbon dioxide-rich stream 244 described herein may comprise a mixture of hydrocarbons and carbon dioxide. Specifically, the carbon dioxide-rich stream 244 contains a decreased concentration of hydrocarbons and an increased carbon dioxide concentration compared to the hydrocarbon feed stream 200. In various embodiments, the carbon dioxide-rich stream 244 comprises less than about 10 percent, less than about 5 percent, or is substantially free of hydrocarbons. In other embodiments, the carbon dioxide-rich stream 244 contains at least about 80 percent, at least about 90 percent, or at least about 95 percent of the carbon dioxide. The carbon dioxide-rich stream 244 described herein may be vented, transported, sold, or used for other purposes including reinjection into a subterranean formation.

The acid gas stream 250 described herein may comprise a mixture of hydrocarbons and at least one acid gas, such as $H_2S$ or carbon dioxide. Specifically, the composition of the acid gas stream 250 may contain a decreased hydrocarbon concentration and an increased acid gas concentration compared to the hydrocarbon feed stream 200. In various embodiments, the acid gas stream 250 comprises less than about 10 percent, less than about 5 percent, or is substantially free of hydrocarbons. In other embodiments, the acid gas stream 250 contains at least about 90 percent, at least about 95 percent, or at least about 99 percent of the acid gas. The acid gas stream 250 described herein may be vented, sold, reinjected, or otherwise disposed of as desired.

Although the hydrocarbon sweetening process 130 may be any sweetening process, in one embodiment the hydrocarbon sweetening process 130 is a physical solvent process. The physical solvent process sweetens the hydrocarbon stream by using an organic solvent to absorb the carbon dioxide from the hydrocarbon stream. Examples of these physical solvents include SELEXOL®, RECTISOL®, PURISOL®, and FLUOR® solvents such as propylene carbonate. The physical solvent process begins by contacting the carbon dioxide-lean stream 234 with the solvent at high pressure. The solvent absorb the carbon dioxide such that subsequent separation of the solvent from the hydrocarbons produces a hydrocarbon stream with a relatively low carbon dioxide concentration. The carbon dioxide-loaded solvent is then regenerated by lowering the pressure of the solvent, typically through a series of flash drums, which causes the carbon dioxide to separate from the solvent. The solvent is then compressed and recycled into the hydrocarbon stream, while the carbon dioxide is vented or sold.

Alternatively, the hydrocarbon sweetening process 130 may be a membrane separation process. Membrane separation processes use membranes to separate carbon dioxide from the carbon dioxide-lean stream 234 at the molecular level. Specifically, the pores in the membranes are sized to allow carbon dioxide to pass through the membrane and form a permeate gas, while the larger hydrocarbon molecules bypass the membrane and form a residue gas. Depending on the composition of the hydrocarbons, this configuration may be reversed such that the carbon dioxide forms the residue gas and the hydrocarbons form the permeate gas. Because the membrane process is dependent on, among other factors, the composition of the hydrocarbons, the selection of the pore size is best determined by persons of ordinary skill in the art.

In yet another embodiment, the hydrocarbon sweetening process 130 may be a carbon dioxide recovery process. One example of a suitable carbon dioxide recovery process is the Ryan-Holmes process. The Ryan-Holmes process uses a solvent and a plurality of columns to separate the carbon dioxide-lean stream 234 into a carbon dioxide-rich stream, a methane-rich stream, and ethane-rich stream, and a heavy hydrocarbon stream. The columns may include a demethanizer, a carbon dioxide recovery unit, a propane recovery unit, and a solvent recovery unit. The columns are arranged in series with the solvent being recycled to the first column in the series. The specific arrangement of the various columns depends on the composition of the feed hydrocarbon stream and is best determined by persons of ordinary skill in the art. Finally, persons of ordinary skill in the art will appreciate that the hydrocarbon sweetening process 130 may be a process other than the exemplary processes described herein.

When the carbon dioxide fractionalization process 100 is implemented prior to a hydrocarbon sweetening process 130, the processing capacity of the hydrocarbon sweetening process 130 is increased. Specifically, the processing capacity of the hydrocarbon sweetening process 130 may be directly proportional to the decrease in carbon dioxide concentration between the hydrocarbon feed stream 100 and the carbon dioxide-lean stream 234. For example, if the carbon dioxide concentration of the carbon dioxide-lean stream 234 is half of the carbon dioxide concentration of the hydrocarbon feed stream 100, then the processing capacity of the hydrocarbon sweetening process 130 is doubled. In addition, the processing capacity of the hydrocarbon sweetening process 130 may be directly proportional to the decrease in flow rate between the hydrocarbon feed stream 100 and the carbon dioxide-lean stream 234. For example, if the flow rate of the carbon dioxide-lean stream 234 is half of the flow rate of the hydrocarbon feed stream 100, then the processing capacity of the hydrocarbon sweetening process 130 is also doubled. The two affects may also be cumulative such that if the carbon dioxide concentration of the carbon dioxide-lean stream 234 is half of the carbon dioxide concentration of the hydrocarbon feed stream 100 and the flow rate of the carbon dioxide-lean stream 234 is half of the flow rate of the hydrocarbon feed stream 100, then the processing capacity of the hydrocarbon sweetening process 130 is increased by a factor of four.

The separators 106, 108, 120, 134 may be any of a variety of process equipment suitable for separating a stream into two separate streams having different compositions, states, temperatures, and/or pressures. For example, one or more of the separators 106, 108, 120, 134 may be a column having trays, packing, or some other type of complex internal structure. Examples of such columns include scrubbers, strippers, absorbers, adsorbers, packed columns, and distillation columns having valve, sieve, or other types of trays. Such columns may employ weirs, downspouts, internal baffles, temperature, and/or pressure control elements. Such columns may also employ some combination of reflux condensers and/or reboilers, including intermediate stage condensers and reboilers. Alternatively, one or more of the separators 106, 108, 120, 134 may be a phase separator. A phase separator is a vessel that separates an inlet stream into a substantially vapor stream and a substantially liquid stream, such as a knock-out drum or a flash drum. Such vessels may have some internal baffles, temperature, and/or pressure control elements, but generally lack any trays or other type of complex internal structure commonly found in columns. Finally, one or more of the separators 106, 108, 120, 134 may be any other type of separator, such as a membrane separator.

The reboilers 110, 124 and condensers 122, 132 described herein may be any of a variety of process equipment suitable for changing the temperature and/or separating any of the streams described herein. In embodiments, the reboilers 110, 124 and the condensers 122, 132 may be any vessel that separates an inlet stream into a substantially vapor stream and a substantially liquid stream. These vessels typically have some internal baffles, temperature, and/or pressure control elements, but generally lack any trays or other type of complex internal structure found in other vessels. In specific embodiments, heat exchangers and kettle-type reboilers may be used as the reboilers 110, 124 and condensers 122, 132 described herein.

The heat exchangers 102, 104, 114, 118, 126 described herein may be any of a variety of process equipment suitable for heating or cooling any of the streams described herein. Generally, heat exchangers 102, 104, 114, 118, 126 are relatively simple devices that allow heat to be exchanged between two fluids without the fluids directly contacting each other. In the case of an air cooler, one of the fluids is atmospheric air, which may be forced over tubes or coils using one or more fans. The types of heat exchangers 102, 104, 114, 118. 126 suitable for use with the carbon dioxide fractionalization process 100 include shell and tube, kettle-type, air cooled, hairpin, bayonet, and plate-fin heat exchangers.

The compressor 112 and pump 128 described herein may be any of a variety of process equipment suitable for increasing the pressure, temperature, and/or density of any of the streams described herein, Generally, compressors are associated with vapor streams and pumps are associated with liquid streams; however such a limitation should not be read into the present processes as the compressors and pumps described herein may be interchangeable based upon the specific conditions and compositions of the streams. The types of compressors and pumps suitable for the uses described herein include centrifugal, axial, positive displacement, rotary, and reciprocating compressors and pumps. Finally, the carbon dioxide fractionalization process 100 may contain additional compressors and/or pumps other than those described herein.

The mixer 116 described herein may either be a dynamic mixer or a static mixer. Dynamic mixers are mixers that employ motion or mechanical agitation to mix two or more streams. For example, a dynamic mixer may be a tank with a paddle operating either in a continuous or batch mode. In contrast, static mixers are mixers that do not employ any motion or mechanical agitation to mix two or more streams. For example, a static mixer may be a convergence of piping designed to combine two streams, such as a pipe tee. Either type of mixer may be configured with internal baffles to promote the mixing of the feed streams.

The energy streams 300, 302, 304, 306, 308, 310, 312, 314 described herein may be derived from any number of suitable sources. For example, heat may be added to a process stream using steam, turbine exhaust, or some other hot fluid and a heat exchanger. Similarly, heat may be removed from a process stream by using a refrigerant, air, or some other cold fluid and a heat exchanger. Further, electrical energy can be supplied to compressors, pumps, and other mechanical equipment to increase the pressure or other physical properties of a fluid. Similarly, turbines, generators, or other mechanical equipment can be used to extract physical energy from a stream and optionally convert the physical energy into electrical energy. Persons of ordinary skill in the art are aware of how to configure the processes described herein with the required energy streams 300, 302, 304, 306, 308, 310, 312, 314. In addition, persons of ordinary skill in the art will appreciate that the carbon dioxide fractionalization process 100 may contain additional equipment, process steams, and/or energy streams other than those described herein.

The carbon dioxide fractionalization process 100 described herein has many advantages. One advantage is that it purifies a hydrocarbon stream used by one of the hydrocarbon sweetening processes 130 described above. Specifically, the carbon dioxide fractionalization process 100 purifies the hydrocarbon stream by removing some of the carbon dioxide and $C_{3+}$ from the hydrocarbon stream. The purification of the hydrocarbon stream improves the performance of the hydrocarbon sweetening process 130 by reducing the carbon dioxide and $C_{3+}$ loading on the hydrocarbon sweetening process 130. The reduction in loading increases the processing capacity for the hydrocarbon sweetening process 130, which is particularly advantageous for existing processing facilities. Moreover, the addition of the carbon dioxide fractionalization process 100 to existing hydrocarbon sweetening processes 130 may reduce the energy requirements of the combined processes. Specifically, the carbon dioxide fractionalization process 100 liquefies some of the carbon dioxide and $C_{3+}$ in the hydrocarbon feed and feeds the carbon dioxide-lean stream 234 to the sweetening process 130, thereby reducing the compression requirements within the hydrocarbon sweetening process 130. The reduction in compression requirements may decrease the total energy requirements of the two processes per unit amount of hydrocarbons, e.g. Btu/SCF (British thermal units per standard cubic foot of gas). Other advantages will be apparent to persons of ordinary skill in the art.

EXAMPLES

In one example, a process simulation was performed using the carbon dioxide fractionalization process 100 shown in FIG. 1. The simulation was performed using the Hyprotech Ltd. HYSYS Process v2.1.1 (Build 3198) software package.

The carbon dioxide fractionalization process 100 separated a West Texas hydrocarbon feed containing about 63 percent carbon dioxide into a carbon dioxide-lean stream 234 containing about 43 percent carbon dioxide, a carbon dioxide-rich stream 244 containing about 95 percent carbon dioxide, an acid gas stream 250 containing about 100 percent carbon dioxide and trace amounts of other acid gases, and a heavy hydrocarbon stream containing about 99 percent $C_{3+}$. It is notable that the process produces 454 gallons per minute of pipeline-grade liquefied carbon dioxide. The carbon dioxide produced by a SELEXOL® plant without this process produces a similar amount of gaseous carbon dioxide, but at atmospheric pressure or at a vacuum. The compression requirements for such a gaseous carbon dioxide stream are large, e.g. 25,000 BTU per MSCF, and are generally cost prohibitive. Thus, the present process allows carbon dioxide to be economically recovered and reused, unlike the prior processes. The material streams, their compositions, and the associated energy streams produced by the simulation are provided in tables 1, 2, and 3 below. The specified values are indicated by an asterisk (*). The physical properties are provided in degrees Fahrenheit (F), pounds per square inch gauge (psig), million standard cubic feet per day (MMSCFD), pounds per hour (lb/hr), U.S. gallons per minute (USGPM), and British thermal units per hour (Btu/hr).

TABLE 2

A: Stream Compositions

| Name | 200 | 248 | 202 | 224 |
|---|---|---|---|---|
| Comp Mole Frac (H2S) | 0.0000* | 0.0000 | 0.0000 | 0.0000 |
| Comp Mole Frac (Nitrogen) | 0.0051* | 0.0051 | 0.0051 | 0.0051 |
| Comp Mole Frac (CO2) | 0.6308* | 0.6317 | 0.6308 | 0.6317 |
| Comp Mole Frac (Methane) | 0.3570* | 0.3577 | 0.3570 | 0.3577 |
| Comp Mole Frac (Ethane) | 0.0037* | 0.0037 | 0.0037 | 0.0037 |
| Comp Mole Frac (Propane) | 0.0013* | 0.0013 | 0.0013 | 0.0013 |
| Comp Mole Frac (i-Butane) | 0.0002* | 0.0002 | 0.0002 | 0.0002 |
| Comp Mole Frac (n-Butane) | 0.0005* | 0.0004 | 0.0005 | 0.0004 |
| Comp Mole Frac (i-Pentane) | 0.0000* | 0.0000 | 0.0000 | 0.000 |
| Comp Mole Frac (n-Pentane) | 0.0000* | 0.0000 | 0.0000 | 0.0000 |
| Comp Mole Frac (n-Hexane) | 0.0007* | 0.0000 | 0.0007 | 0.0000 |
| Comp Mole Frac (n-Octane) | 0.0008* | 0.0000 | 0.0008 | 0.0000 |
| Comp Mole Frac (H2O) | 0.0000* | 0.0000 | 0.0000 | 0.0000 |

B: Stream Compositions

| Name | 230 | 240 | 232 | 234 |
|---|---|---|---|---|
| Comp Mole Frac (H2S) | 0.0000 | 0.0000 | 0.0000 | 0.0000 |
| Comp Mole Frac (Nitrogen) | 0.0083 | 0.0001 | 0.0083 | 0.0083 |
| Comp Mole Frac (CO2) | 0.4303 | 0.9500 | 0.4303 | 0.4303 |
| Comp Mole Frac (Methane) | 0.5568 | 0.0430 | 0.5568 | 0.5568 |
| Comp Mole Frac (Ethane) | 0.0041 | 0.0031 | 0.0041 | 0.0041 |

TABLE 1

A: Material Streams

| Name | 200 | 245 | 202 | 224 |
|---|---|---|---|---|
| Vapor Fraction | 1.0000 | 1.0000 | 1.0000 | 1.0000 |
| Temperature (F.) | 100.0* | -15.92 | 99.00* | 60.00* |
| Pressure (psig) | 485.3* | 385.3 | 480.3 | 980.3 |
| Molar Flow (MMSCFD) | 100.0* | 99.82 | 100.0 | 99.82 |
| Mass Flow (lb/hr) | 3.731e+05 | 3.713e+05 | 3.731e+05 | 3.713e+05 |
| Liquid Volume Flow (USGPM) | 1176 | 1171 | 1176 | 1171 |
| Heat Flow (Btu/hr) | −1.305e+09 | −1.316e+09 | −1.305e+09 | −1.315e+09 |

B: Material Streams

| Name | 230 | 240 | 232 | 224 |
|---|---|---|---|---|
| Vapor Fraction | 1.0000 | 0.0000 | 1.0000 | 1.0000 |
| Temperature (F.) | −57.69 | 65.16 | 92.33 | 92.78 |
| Pressure (psig) | 925.3 | 935.5 | 920.3 | 915.3 |
| Molar Flow (MMSCFD) | 61.13 | 38.68 | 61.13 | 61.13 |
| Mass Flow (lb/hr) | 1.896e+05 | 1.817e+05 | 1.896e+05 | 1.896e+05 |
| Liquid Volume Flow (USGPM) | 716.7 | 454.5 | 716.7 | 716.7 |
| Heat Flow (Btu/hr) | −6.742e+08 | −7.078e+08 | −6.145e+08 | −6. 145e+08 |

C: Material Streams

| Name | 244 | 242 | 218 | 212 |
|---|---|---|---|---|
| Vapor Fraction | 0.0000 | 0.0000 | 1.0000 | 0.0000 |
| Temperature (F.) | 72.39 | 55.00 | 123.3 | 264.0 |
| Pressure (psig) | 1785* | 930.3 | 985.3* | 395.3 |
| Molar Flow (MMSCFD) | 38.68 | 38.68 | 99.82 | 0.1832 |
| Mass Flow (lb/hr) | 1.817e+05 | 1.817e+05 | 3.713e+005 | 1801 |
| Liquid Volume Flow (USGPM) | 454.5 | 454.5 | 1171 | 5.233 |
| Heat Flow (Btu/hr) | −7.092e+08 | −7.100e+08 | −1.306e+09 | −1.905e+06 |

D: Material Streams

| Name | 250 | 252 | 254 |
|---|---|---|---|
| Vapor Fraction | 1.0000 | 0.0000 | 0.0000 |
| Temperature (F.) | 100.0* | 265.2* | 120.0* |
| Pressure (psig) | 485.3* | 485.3* | 465.3* |
| Molar Flow (MMSCFD) | 0.02473 | 0.1585 | 0.1585 |
| Mass Flow (lb/hr) | 119.5 | 1682 | 1682 |
| Liquid Volume Flow (USGPM) | 0.2892 | 4.944 | 4.944 |
| Heat Flow (Btu/hr) | −4.610e+05 | −1.444e+06 | −1.593+06 |

TABLE 2-continued

| | | | | |
|---|---|---|---|---|
| Comp Mole Frac (Propane) | 0.0005 | 0.0025 | 0.0005 | 0.0005 |
| Comp Mole Frac (i-Butane) | 0.0000 | 0.0004 | 0.0000 | 0.0000 |
| Comp Mole Frac (n-Butane) | 0.0000 | 0.0010 | 0.0000 | 0.0000 |
| Comp Mole Frac (i-Pentane) | 0.0000 | 0.0000 | 0.0000 | 0.0000 |
| Comp Mole Frac (n-Pentane) | 0:0000 | 0.0000 | 0.0000 | 0.0000 |
| Comp Mole Frac (n-Hexane) | 0.0000 | 0.0000 | 0.0000 | 0.0000 |
| Comp Mole Frac (n-Octane) | 0.0000 | 0.0000 | 0.0000 | 0.0000 |
| Comp Mole Frac (H2O) | 0.0000 | 0.0000 | 0.0000 | 0.0000 |

C: Stream Compositions

| Name | 244 | 242 | 218 | 212 |
|---|---|---|---|---|
| Comp Mole Frac (H2S) | 0.0000 | 0.0000 | 0.0000 | 0.0000 |
| Comp Mole Frac (Nitrogen) | 0.0001 | 0.0001 | 0.0051 | 0.0000 |
| Comp Mole Frac (CO2) | 0.9500 | 0.9500 | 0.6317 | 0.1350 |
| Comp Mole Frac (Methane) | 0.0430 | 0.0430 | 0.3577 | 0.0001 |
| Comp Mole Frac (Ethane) | 0.0031 | 0.0031 | 0.0037 | 0.0050 |
| Comp Mole Frac (Propane) | 0.0025 | 0.0025 | 0.0013 | 0.0142 |
| Comp Mole Frac (i-Butane) | 0.0004 | 0.0004 | 0.0002 | 0.0078 |
| Comp Mole Frac (n-Butane) | 0.0010 | 0.0010 | 0.0004 | 0.0472 |
| Comp Mole Frac (i-Pentane) | 0.0000 | 0.0000 | 0.0000 | 0.0000 |
| Comp Mole Frac (n-Pentane) | 0.0000 | 0.0000 | 0.0000 | 0.0000 |
| Comp Mole Frac (n-Hexane) | 0.0000 | 0.0000 | 0.0000 | 0.3813 |
| Comp Mole Frac (n-Octane) | 0.0000 | 0.0000 | 0.0000 | 0.4094 |
| Comp Mole Frac (H2O) | 0.0000 | 0.0000 | 0.0000 | 0.0000 |

D: Stream Compositions

| Name | 250 | 252 | 254 |
|---|---|---|---|
| Comp Mole Frac (H2S) | 0.0000 | 0.0000 | 0.0000 |
| Comp Mole Frac (Nitrogen) | 0.0000 | 0.0000 | 0.0000 |
| Comp Mole Frac (CO2) | 1.0000 | 0.0000 | 0.0000 |
| Comp Mole Frac (Methane) | 0.0000 | 0.0001 | 0.0001 |
| Comp Mole Frac (Ethane) | 0.0000 | 0.0058 | 0.0058 |
| Comp Mole Frac (Propane) | 0.0000 | 0.0164 | 0.0164 |
| Comp Mole Frac (i-Butane) | 0.0000 | 0.0090 | 0.0090 |

TABLE 2-continued

| | | | |
|---|---|---|---|
| Comp Mole Frac (n-Butane) | 0.0000 | 0.0545 | 0.0545 |
| Comp Mole Frac (i-Pentane) | 0.0000 | 0.0000 | 0.0000 |
| Comp Mole Frac (n-Pentane) | 0.0000 | 0.0000 | 0.0000 |
| Comp Mole Frac (n-Hexane) | 0.0000 | 0.4408 | 0.4408 |
| Comp Mole Frac (n-Octane) | 0.0000 | 0.4733 | 0.4733 |
| Comp Mole Frac (H2O) | 0.0000 | 0.0000 | 0.0000 |

TABLE 3

Energy Streams

| Name | HeatFlow (Btu/hr) |
|---|---|
| 308 | 8.518e+06 |
| 302 | 3.623e+05 |
| 304 | 1.027e+07 |
| 306 | 2.505e+07 |
| 314 | 7.719e+05 |
| 310 | 2.184e+06 |
| 312 | 1.293e+07 |

In another example, a process simulation was performed using the carbon dioxide fractionalization process 100 shown in FIG. 2. The simulation was performed using the Hyprotech Ltd. HYSYS Process v2.1.1 (Build 3198) software package. The carbon dioxide fractionalization process 100 separated a West Texas hydrocarbon feed containing about 63 percent carbon dioxide into a carbon dioxide-lean stream 234 containing about 36 percent carbon dioxide, a carbon dioxide-rich stream 244 containing about 95 percent carbon dioxide, and a heavy hydrocarbon stream containing about 93 percent $C_{3+}$. The material streams, their compositions, and the associated energy streams produced by the simulation are provided in tables 4, 5, and 6 below.

TABLE 4

A: Material Streams

| Name | 200 | 204 | 206 | 222 |
|---|---|---|---|---|
| Vapor Fraction | 1.0000 | 0.8205 | 0.0000 | 1.0000 |
| Temperature (F.) | 100.0* | 22.00* | 22.00 | 34.23 |
| Pressure (psig) | 945.3* | 935.3 | 935.3 | 935.3 |
| Molar Flow (MMSCFD) | 300.0* | 300.0 | 53.85 | 299.6 |
| Mass Flow (lb/hr) | 1.119e+06 | 1.119e+06 | 2.343e+05 | 1.115e+06 |
| Liquid Volume Flow (USGPM) | 3529 | 3529 | 640.1 | 3516 |
| Heat Flow (Btu/hr) | −3.932e+09 | −3.988e+09 | −8.836e+08 | −3.961e+09 |

B: Material Streams

| Name | 214 | 212 | 202 | 218 |
|---|---|---|---|---|
| Vapor Fraction | 1.0000 | 0.0000 | 1.0000 | 1.0000 |
| Temperature (F.) | −5.027 | 335.1 | 47.95 | 100.0* |
| Pressure (psig) | 335.3 | 340.3 | 940.3 | 960.3* |
| Molar Flow (MMSCFD) | 53.41 | 0.4397 | 300.0 | 53.41 |
| Mass Flow (lb/hr) | 2.299e+05 | 4409 | 1.119e+06 | 2.299e+05 |
| Liquid Volume Flow (USGPM) | 627.1 | 12.95 | 3529 | 627.1 |
| Heat Flow (Btu/hr) | −8.582e+08 | −4.030e+06 | −3.957e+09 | −8.564e+08 |

C: Material Streams

| Name | 224 | 230 | 240 | 232 |
|---|---|---|---|---|
| Vapor Fraction | 1.0000 | 1.0000 | 0.00000 | 1.0000 |
| Temperature (F.) | 32.00* | −20.00 | 61.65 | −17.19 |
| Pressure (psig) | 930.3 | 895.3 | 900.3 | 890.3 |
| Molar Flow (MMSCFD) | 299.6 | 161.3 | 138.3 | 161.3 |
| Mass Flow (lb/hr) | 1.115e+06 | 4.649e+05 | 6.501e+05 | 4.649e+05 |

TABLE 4-continued

| | | | | |
|---|---|---|---|---|
| Liquid Volume Flow (USGPM) | 3516 | 1890 | 1626 | 1890 |
| Heat Flow (Btu/hr) | −3.962e+09 | −1.473e+09 | −2.533e+09 | −1.472e+09 |

D: Material Streams

| Name | 234 | 244 | 242 | 220 | 216 |
|---|---|---|---|---|---|
| Vapor Fraction | 1.0000 | 0.0000 | 0.0000 | 1.0000 | 1.0000 |
| Temperature (F.) | 85.00* | 73.48 | 55.00* | 22.00 | 155.2 |
| Pressure (psig) | 885.3 | 1785* | 895.3 | 935.3 | 965.3 |
| Molar Flow (MMSCFD) | 161.3 | 138.3 | 138.3 | 246.2 | 53.41 |
| Mass Flow (lb/hr) | 4.649e+05 | 6.501e+05 | 6.501e+05 | 8.851e+05 | 2.299e+05 |
| Liquid Volume Flow (USGPM) | 1890 | 1626 | 1626 | 2889 | 627.1 |
| Heat Flow (Btu/hr) | −1.446e+09 | −2.535e+09 | −2.538e+09 | −3.105e+09 | −8.518e+08 |

TABLE 5

A: Stream Compositions

| Name | 200 | 204 | 206 | 220 |
|---|---|---|---|---|
| Comp Mole Frac (H2S) | 0.0000* | 0.0000 | 0.0000 | 0.0000 |
| Comp Mole Frac (Nitrogen) | 0.0051* | 0.0051 | 0.0016 | 0.0051 |
| Comp Mole Frac (CO2) | 0.6308* | 0.6308 | 0.8168 | 0.6316 |
| Comp Mole Frac (Methane) | 0.3570* | 0 3570 | 0.1680 | 0.3576 |
| Comp Mole Frac (Ethane) | 0.0037* | 0.0037 | 0.0037 | 0.0037 |
| Comp Mole Frac (Propane) | 0.0013* | 0.0013 | 0.0020 | 0.0013 |
| Comp Mole Frac (i-Butane) | 0.0002* | 0.0002 | 0.0004 | 0.0001 |
| Comp Mole Frac (n-Butane) | 0.0005* | 0.0005 | 0.0011 | 0.0003 |
| Comp Mole Frac (i-Pentane) | 0.0000* | 0.0000 | 0.0000 | 0.0000 |
| Comp Mole Frac (n-Pentane) | 0.0000* | 0.0000 | 0.0000 | 0.0000 |
| Comp Mole Frac (n-Hexane) | 0.0007* | 0.0007 | 0.0028 | 0.0002 |
| Comp Mole Frac (n-Octane) | 0.0008* | 0.0008 | 0.0037 | 0.0001 |
| Comp Mole Frac (H2O) | 0.0000* | 0.0000 | 0.0000 | 0.0000 |

B: Stream Compositions

| Name | 214 | 212 | 202 | 218 |
|---|---|---|---|---|
| Comp Mole Frac (H2S) | 0.0000 | 0.0000 | 0.0000 | 0.0000 |
| Comp Mole Frac (Nitrogen) | 0.0016 | 0.0000 | 0.0051 | 0.0016 |
| Comp Mole Frac (CO2) | 0.8229 | 0.0700 | 0.6308 | 0.8229 |
| Comp Mole Frac (Methane) | 0.1693 | 0.0000 | 0.3570 | 0.1693 |
| Comp Mole Frac (Ethane) | 0.0037 | 0.0000 | 0.0037 | 0.0037 |
| Comp Mole Frac (Propane) | 0.0018 | 0.0302 | 0.0013 | 0.0018 |
| Comp Mole Frac (i-Butane) | 0.0001 | 0.0252 | 0.0002 | 0.0001 |
| Comp Mole Frac (n-Butane) | 0.0003 | 0.0949 | 0.0005 | 0.0003 |
| Comp Mole Frac (i-Pentane) | 0.0000 | 0.0000 | 0.0000 | 0.0000 |
| Comp Mole Frac (n-Pentane) | 0.0000 | 0.0000 | 0.0000 | 0.0000 |
| Comp Mole Frac (n-Hexane) | 0.0001 | 0.3260 | 0.0007 | 0.0001 |
| Comp Mole Frac (n-Octane) | 0.0000 | 0.4537 | 0.0008 | 0.0000 |
| Comp Mole Frac (H2O) | 0.0000 | 0.0000 | 0.0000 | 0.0000 |

C: Stream Compositions

| Name | 224 | 230 | 240 | 232 |
|---|---|---|---|---|
| Comp Mole Frac (H2S) | 0.0000 | 0.0000 | 0.0000 | 0.0000 |
| Comp Mole Frac (Nitrogen) | 0.0051 | 0.0094 | 0.0000 | 0.0094 |
| Comp Mole Frac (CO2) | 0.6316 | 0.3586 | 0.9500 | 0.3586 |
| Comp Mole Frac (Methane) | 0.3576 | 0.6275 | 0.0428 | 0.6275 |
| Comp Mole Frac (Ethane) | 0.0037 | 0.0041 | 0.0032 | 0.0041 |
| Comp Mole Frac (Propane) | 0.0013 | 0.0004 | 0.0023 | 0.0004 |
| Comp Mole Frac (i-Butane) | 0.0001 | 0.0000 | 0.0003 | 0.0000 |
| Comp Mole Frac (n-Butane) | 0.0003 | 0.0000 | 0.0007 | 0.0000 |
| Comp Mole Frac (i-Pentane) | 0.0000 | 0.0000 | 0.0000 | 0.0000 |
| Comp Mole Frac (n-Pentane) | 0.0000 | 0.0000 | 0.0000 | 0.0000 |
| Comp Mole Frac (n-Hexane) | 0.0002 | 0.0000 | 0.0005 | 0.0000 |
| Comp Mole Frac (n-Octane) | 0.0001 | 0.0000 | 0.0002 | 0.0000 |
| Comp Mole Frac (H2O) | 0.0000 | 0.0000 | 0.0000 | 0.0000 |

D: Stream Compositions

| Name | 234 | 244 | 242 | 220 | 216 |
|---|---|---|---|---|---|
| Comp Mole Frac (H2S) | 0.0000 | 0.0000 | 0.0000 | 0.0000 | 0.0000 |

TABLE 5-continued

| | | | | | |
|---|---|---|---|---|---|
| Comp Mole Frac (Nitrogen) | 0.0094 | 0.0000 | 0.0000 | 0.0059 | 0.0016 |
| Comp Mole Frac (CO2) | 0.3586 | 0.9500 | 0.9500 | 0.5901 | 0.8229 |
| Comp Mole Frac (Methane) | 0.6275 | 0.0428 | 0.0428 | 0.3984 | 0.1693 |
| Comp Mole Frac (Ethane) | 0.0041 | 0.0032 | 0.0032 | 0.0037 | 0.0037 |
| Comp Mole Frac (Propane) | 0.0004 | 0.0023 | 0.0023 | 0.0011 | 0.0018 |
| Comp Mole Frac (i-Butane) | 0.0000 | 0.0003 | 0.0003 | 0.0001 | 0.0001 |
| Comp Mole Frac (n-Butane) | 0.0000 | 0.0007 | 0.0007 | 0.0003 | 0.0003 |
| Comp Mole Frac (i-Pentane) | 0.0000 | 0.0000 | 0.0000 | 0.0000 | 0.0000 |
| Comp Mole Frac (n-Pentane) | 0.0000 | 0.0000 | 0.0000 | 0.0000 | 0.0000 |
| Comp Mole Frac (n-Hexane) | 0.0000 | 0.0005 | 0.0005 | 0.0002 | 0.0001 |
| Comp Mole Frac (n-Octane) | 0.0000 | 0.0002 | 0.0002 | 0.0001 | 0.0000 |
| Comp Mole Frac (H2O) | 0.0000 | 0.0000 | 0.0000 | 0.0000 | 0.0000 |

TABLE 6

Energy Streams

| Name | HeatFlow (Btu/hr) |
|---|---|
| 300 | 3.107e+07 |
| 302 | 2.138e+07 |
| 304 | 6.401e+06 |
| 306 | 7.371e+07 |
| 308 | 3.014e+07 |
| 314 | 2.890e+06 |
| 310 | 4.946e+06 |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Specifically, while the process is described in terms of a continuous process, it is contemplated that the process can be implemented as a batch process. In addition, where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Moreover, the percentages described herein may be mole fraction, weight fraction, or volumetric fraction.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A process comprising:

receiving a hydrocarbon feed stream comprising carbon dioxide;

separating the hydrocarbon feed stream into a light hydrocarbon stream and a heavy hydrocarbon stream;

separating the light hydrocarbon stream into a carbon dioxide-rich stream and a carbon dioxide-lean stream; [and]

*exchanging heat between the hydrocarbon feed stream and the carbon dioxide-lean stream;* feeding the carbon dioxide-lean stream into a hydrocarbon sweetening process, thereby increasing the processing capacity of the hydrocarbon sweetening process [compared to the processing capacity of the hydrocarbon sweetening process]when fed the hydrocarbon feed stream[.]*; and*

*cooling the light hydrocarbon stream with the carbon dioxide-lean stream.*

[2. The process of claim 1 wherein the hydrocarbon sweetening process comprises:

absorbing at least some of the carbon dioxide from the carbon dioxide-lean stream with a solvent;

separating the solvent from the carbon dioxide-lean stream; and releasing at least some of the carbon dioxide from the solvent by lowering the pressure of the solvent.]

[3. The process of claim 1 wherein the hydrocarbon sweetening process comprises: separating at least some of the carbon dioxide from the carbon dioxide-lean stream using a membrane.]

[4. The process of claim 1 wherein the hydrocarbon sweetening process comprises:

absorbing at least some of the carbon dioxide from the carbon dioxide-lean stream with a solvent;

separating a methane-rich stream from the solvent;

separating an ethane-rich stream from the solvent; and separating a heavy hydrocarbon stream from the solvent.]

[5. The process of claim 1 wherein the hydrocarbon feed stream contains from about 30 percent to about 80 percent carbon dioxide.]

[6. The process of claim 1 wherein the carbon dioxide-lean stream contains less than about 60 percent carbon dioxide and less than about 5 percent $C_{3+}$.]

[7. The process of claim 1 wherein the carbon dioxide-lean stream contains at least about 95 percent of a combination of methane and carbon dioxide.]

[8. The process of claim 1 wherein the heavy hydrocarbon stream contains at least about 90 percent $C_{3+}$.]

[9. The process of claim 1 wherein the carbon dioxide-rich stream contains at least about 95 percent carbon dioxide.]

[10. The process of claim 1 further comprising: transferring the carbon dioxide-rich stream to a pipeline for injection into a subterranean formation.]

[11. The process of claim 1 wherein the increase in processing capacity of the hydrocarbon sweetening process is directly proportional to the decrease in carbon dioxide concentration between the hydrocarbon feed stream and the carbon dioxide-lean stream, and the decrease in flow rate between the hydrocarbon feed stream and the carbon dioxide-lean stream.]

[12. A process comprising:

receiving a hydrocarbon feed stream comprising carbon dioxide;

cooling the hydrocarbon feed stream using a carbon dioxide-lean stream;

separating the cooled hydrocarbon feed stream into a light hydrocarbon stream and a heavy hydrocarbon stream;

compressing the light hydrocarbon stream;

cooling the compressed light hydrocarbon stream using the carbon dioxide-lean stream;

separating the compressed light hydrocarbon stream into a carbon dioxide-rich stream and the carbon dioxide-lean stream; and removing at least some of the carbon dioxide in the carbon dioxide-lean stream using a hydrocarbon sweetening process.]

[13. The process of claim 12 further comprising: separating the heavy hydrocarbon stream into an acid gas stream and a heavy hydrocarbon stream.]

[14. The process of claim 12 wherein separating the cooled hydrocarbon feed stream into a light hydrocarbon stream and a heavy hydrocarbon stream comprises:

separating the cooled hydrocarbon feed stream into a light fraction and a heavy fraction;

separating the heavy fraction into the light hydrocarbon stream and the heavy hydrocarbon stream; and combining the light fraction with the light hydrocarbon stream.]

[15. The process of claim 12 wherein the hydrocarbon sweetening process is a physical solvent process, a membrane process, or a carbon dioxide recovery process.]

*16. The process of claim 1 wherein exchanging heat between the hydrocarbon feed stream and the carbon dioxide-lean stream comprises cooling the hydrocarbon feed stream using the carbon dioxide-lean stream.*

*17. A process comprising:*

*receiving a hydrocarbon feed stream comprising carbon dioxide;*

*separating the hydrocarbon feed stream into a light hydrocarbon stream and a heavy hydrocarbon stream;*

*separating the light hydrocarbon stream into a carbon dioxide-rich stream and a carbon dioxide-lean stream;*

*cooling the light hydrocarbon stream using the carbon-dioxide lean stream; and*

*feeding the carbon dioxide lean stream into a hydrocarbon sweetening process, thereby increasing the processing capacity of the hydrocarbon sweetening process when fed the hydrocarbon feed stream.*

*18. The process of claim 17 wherein the at least one stream cooled using the carbon-dioxide lean stream comprises the hydrocarbon feed stream.*

*19. A process comprising:*

*receiving a hydrocarbon feed stream comprising carbon dioxide;*

*separating the hydrocarbon feed stream into a light hydrocarbon stream and a heavy hydrocarbon stream;*

*separating the light hydrocarbon stream into a carbon dioxide-rich stream and a carbon dioxide-lean stream;*

*cooling the light hydrocarbon stream with the carbon dioxide-lean stream;*

*further processing the heavy hydrocarbon stream;*

*feeding the carbon-dioxide-rich stream to further processing including at least one heat exchanger; and*

*feeding the carbon dioxide-lean stream into a hydrocarbon sweetening process comprising a SELEXOL plant, thereby increasing the processing capacity of the hydrocarbon sweetening process when fed the hydrocarbon feed stream.*

*20. The process of claim 19 wherein further processing of the heavy hydrocarbon stream comprises using a separator.*

*21. The process of claim 19 wherein further processing of the heavy hydrocarbon stream comprises using a heat exchanger.*

*22. The process of claim 19 further comprising the step of infecting carbon dioxide into a subterranean formation.*

* * * * *

UNITED STATES PATENT AND TRADEMARK OFFICE

CERTIFICATE OF CORRECTION

PATENT NO. : RE44,462 E
APPLICATION NO. : 13/735646
DATED : August 27, 2013
INVENTOR(S) : Eric Prim It is certified that error appears in the above-identified patent and that said Letters Patent is hereby corrected as shown below:

In the Specification

Column 5, line 6, please delete "C3-" and substitute therefore --C3+--.

Column 6, line 8, please delete "absorb" and substitute therefore --absorbs--.

Column 9, Table 1, under section "A: Material Streams", first row, please delete "245" and substitute therefore --248--.

Column 9, Table 1, under section "B: Material Streams", first row, please delete "224" and substitute therefore --234--.

Column 9, Table 1, under section "B: Material Streams", eighth row, please delete "-6.724e+08" and substitute therefore --6.242e+08--.

In the Claims

Column 17, claim 22, line 2, please delete "infecting" and substitute therefore --injecting--.

Signed and Sealed this
Fifteenth Day of October, 2013

Teresa Stanek Rea
*Deputy Director of the United States Patent and Trademark Office*